United States Patent [19]

Mobach

[11] Patent Number: 5,574,986
[45] Date of Patent: Nov. 12, 1996

[54] TELECOMMUNICATION SYSTEM, AND A FIRST STATION, A SECOND STATION, AND A TRANSCEIVER FOR USE IN SUCH A SYSTEM

[75] Inventor: Carel H. D. Mobach, Eindhoven, Netherlands

[73] Assignee: U.S. Philips Corporation, New York, N.Y.

[21] Appl. No.: 340,569

[22] Filed: Nov. 16, 1994

[30] Foreign Application Priority Data

Nov. 22, 1993 [EP] European Pat. Off. ............. 93203262

[51] Int. Cl.[6] .................................................. H04B 1/40
[52] U.S. Cl. ............................. 455/76; 455/260; 455/296
[58] Field of Search ................................. 455/76, 77, 78, 455/82, 83, 260, 296, 306, 307, 310, 80, 84, 86, 87; 331/2

[56] References Cited

U.S. PATENT DOCUMENTS

| | | | |
|---|---|---|---|
| 5,175,729 | 12/1992 | Borras et al. | 455/76 |
| 5,249,305 | 9/1993 | Wieczorek et al. | 455/76 |
| 5,461,344 | 10/1995 | Andoh | 331/25 |

Primary Examiner—Reinhard J. Eisenzopf
Assistant Examiner—Marsha D. Banks-Harold
Attorney, Agent, or Firm—Leroy Eason

[57] ABSTRACT

In a cordless telephony system such as CT1 or CT1[+] there is only a small separation between the transmit and receive frequencies. Consequently, when transceivers with so-called dual frequency synthesizers in a single package are used for the respective receiver and transmitter branches, crosstalk via the synthesizer package occurs between the two branches. To suppress such crosstalk, in accordance with the invention low pass and high pass filters are included in the respective paths from the receiver and transmitter branches through the dual frequency synthesizers.

7 Claims, 2 Drawing Sheets

| | BS | | | HS1 , HS2 | | |
|---|---|---|---|---|---|---|
| | Tx | Rx | Rx—VCO | Tx | Rx | Rx—VCO |
| CT1 | 959 | 914 | 856 | 914 | 959 | 1017 |
| CT1+ | 931 | 886 | 828 | 886 | 931 | 989 |

TELECOMMUNICATION SYSTEM, AND A FIRST STATION, A SECOND STATION, AND A TRANSCEIVER FOR USE IN SUCH A SYSTEM

BACKGROUND OF THE INVENTION

1. Field of Invention

The present invention relates to a telecommunication system comprising a first station with a first transceiver, and at least a second station with a second transceiver, the first and second station being arranged for radio communication with each other. At least one transceiver comprises a receiver branch with a first phase-lock-loop for providing a first local oscillator signal, and a transmitter branch with a second phase-lock-loop for providing a second local oscillator signal, the first and the second phase-lock-loop respectively comprising a first and a second synthesizer, which are galvanically coupled with each other. Such a system can be a cordless telephone system, a cellular telephone system, or any system in which transceivers communicate with each other by radio.

The invention further relates to a station for use in such a system and to a transceiver for use in such a station.

2. Description of the Related Art

A system of this kind is well-known as a cordless telephone system, such as a system according to the CT1 or CT1$^+$ Standard. The use of galvanically coupled synthesizers in a transceiver is known from a Philips Semiconductors Application Note for an Integrated Circuit of type UMA1015M, "Low-power dual frequency synthesizer for radio communications", June 1993, version 2.1 for Cordless telephone or Hand-held mobile radio, or the like.

A problem in a transceiver employing such an IC is interference of the transmitter branch with the receiver branch, i.e. a transmitter signal may be present in the spectrum of the local oscillator signal in the receiver branch. Such a problem is the more severe when the transmit and receive frequency are relatively close to each other, such as in the CT1 system or CT1$^+$ system. In the German FTZ Regulation FTZ 1-TR2, or in the Dutch CEPT T/R 24-03 Regulation, regulations with regard to such so-called receiver spurious responses are given.

SUMMARY OF THE INVENTION

It is an object of the present invention to provide a telecommunication system of the above kind in which the transceivers comply with regulation of national Authorities as to receiver spurious responses.

To this end, a telecommunication system according to the present invention is characterised in that the receiver branch comprises a first frequency multiplier arrangement for multiplying the frequency of the first local oscillator signal by a first integer greater than one, an output of the first frequency multiplier arrangement being coupled to an rf-path of the receiver branch. At least one of the phase-locked loops in one of the branches comprises a filter for the suppression of spurious signals from the other branch. It is achieved that disturbing signals from the transmitter branch through the second and the first synthesizer to the receiver branch are suppressed to a great extent. As mainly signal leakage occurs via the IC package, pins, and bonds, the filter according to the present invention preferably is not integrated within the synthesizer package.

In embodiments of the system, the filter is a low pass filter coupled between an input of the first frequency multiplier arrangement and the synthesizer, or a high pass filter coupled between the output of the first frequency arrangement and the first synthesizer.

In an embodiment of a telecommunication system according to the present invention, the transmitter branch comprises a second frequency multiplier arrangement for multiplying the second local oscillator signal by a second integer value greater than one, an output of the second frequency multiplier arrangement being coupled to an rf-path of the transmitter branch. A second high pass filter is coupled between the output of the second frequency multiplier arrangement and the second synthesizer when the first low pass filter is present, or the second low pass filter is coupled between an input of the second frequency multiplier arrangement and the second synthesizer when the first high pass filter is present. It is achieved that disturbing signals from the receiver branch through the first and the second synthesizer to the transmitter path are suppressed to a great extent, thereby minimizing transmitter spurious emissions. It is to be noted that the problem of suppressing transmitter spurious emissions is less severe than the problem of suppressing receiver spurious responses, because in the transmitter branch usually a transmit filter is present in the rf-path, which transmit filter also filters signals outside the transmission band.

Instead of coupled phase-lock-loops, according to the present invention, these PLLs may be replaced by frequency-lock loops. As is well-known in the art, a phase lock loop is essentially the same as a frequency lock loop and the term as used herein and in the appended claims means a loop of either type.

In an embodiment of the present invention, the first multiplier arrangement may be located in the transmitter branch, and the first low pass filter or high pass filter may be located at corresponding locations in the first phase-lock-loop.

BRIEF DESCRIPTION OF THE DRAWINGS

The present invention will now be described, by way of example, with reference to the accompanying drawings, wherein.

Throughout the figures the same reference numerals are used for the same features.

DESCRIPTION OF THE PREFERRED EMBODIMENTS

Figures 1, 3:
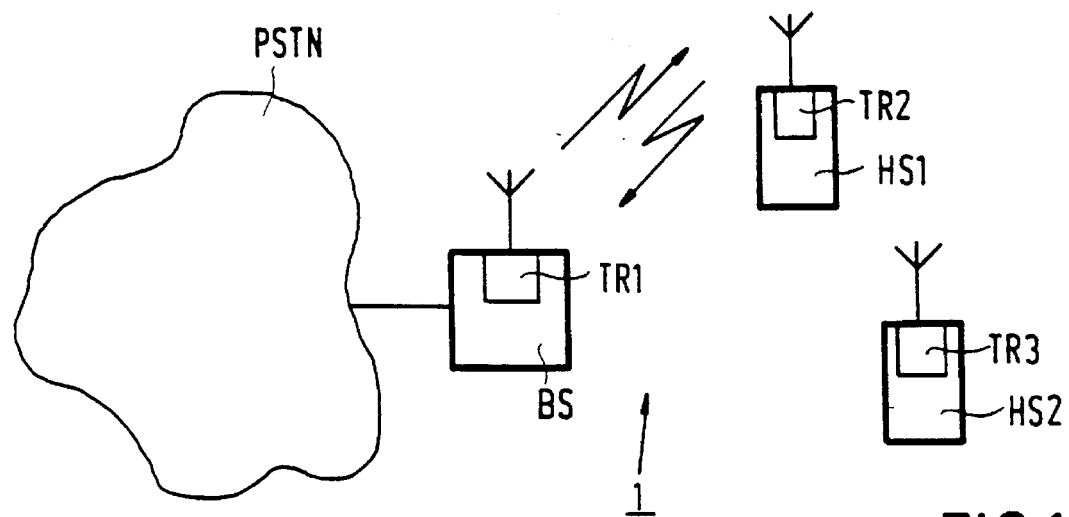
FIG. 1 shows a telecommunication system according to the present invention.
FIG. 3 shows frequencies for a first and the second station in a system shown in FIG. 1.

FIG. 1 shows a telecommunication system 1 according to the present invention, which can be a cordless telephony system. The system 1 comprises a first station BS, which is a cordless telephony base station e.g. in a CT1 or a CT1$^+$ system, with a first transceiver TR1. The first station BS is coupled to the Public Switched Telephone Network PSTN. The system 1 further comprises a second station HS 1, which is a cordless telephony handset, and which comprises a second transceiver TR2. Further shown is another second station as a cordless handset HS2 with a transceiver TR3.

Preferably, all transceivers in the system 1 are transceivers as according to the present invention. For a more detailed description of a cordless telephone system, reference may be had to the numerous available handbooks with respect to such systems. The stations are arranged for duplex radio communications with each other.

Figure 2:
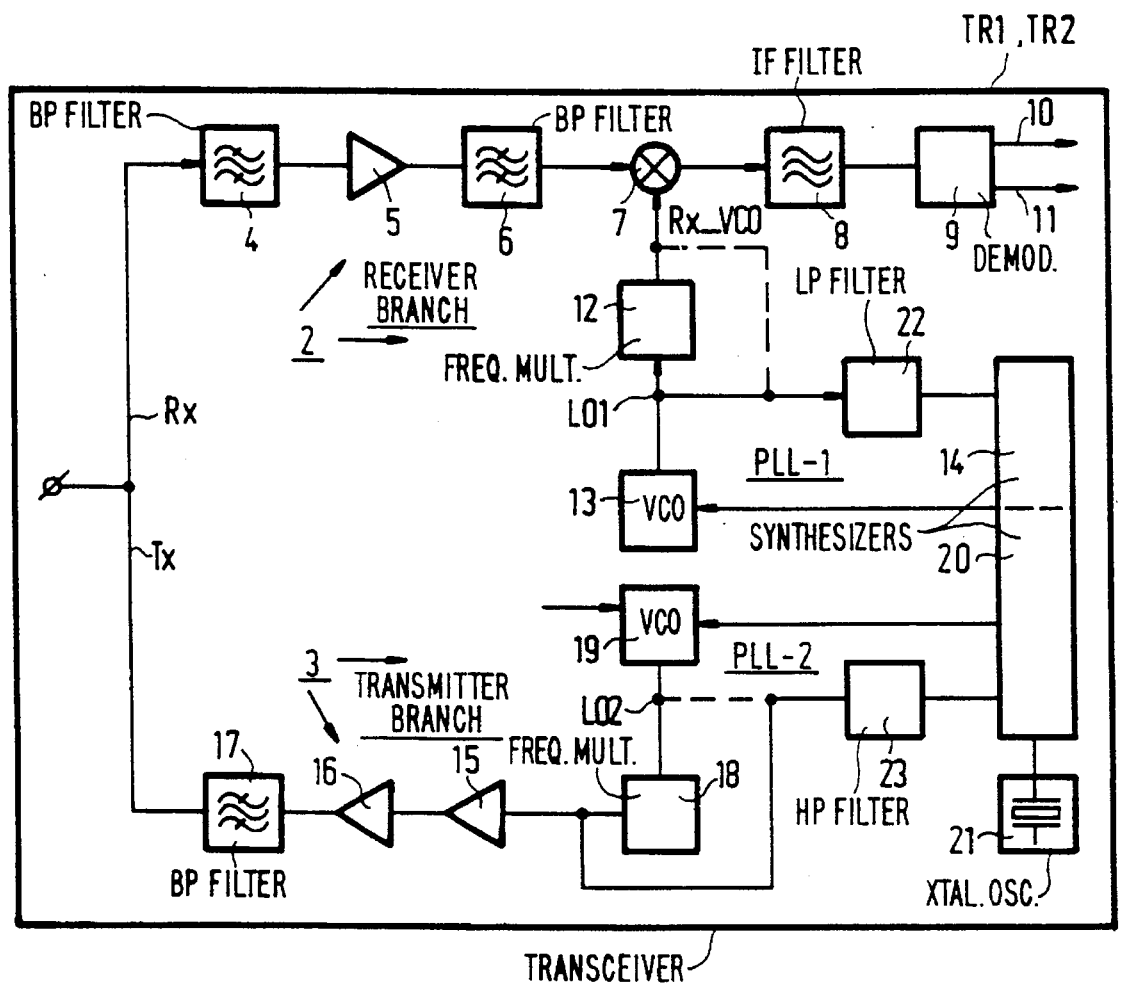
FIG. 2 shows the transceiver for use in a telecommunication system in FIG. 1.

FIG. 2 shows a tranceiver such as the transceivers TR1, TR2 for use in the first station BS and the second station HSI in the telecommunication system 1 according to the present invention. Shown are those parts of the transceiver which are relevant to the present invention. The transceiver has a receiver branch 2 and a transmitter branch 3, which are coupled to transmission means for (not shown) receiving and transmitting radio waves. The receiver branch 2 successively comprises a bandfilter 4, an rf-amplifier 5 (radio frequency), a bandfilter 6, a mixer 7, an IF-filter 8 (Intermediate Frequency), and a demodulator 9, e.g. an FM-demodulator, providing a baseband signal (low frequency) and an RSSI signal (Received Signal Strength Indication). The receiver branch 2 further comprises a first phase-lock-loop PLL-1 for providing a first local oscillator signal LO1 to the mixer 7, via a first frequency multiplier arrangement 12 for multiplying the first local oscillator signal by a first integer greater than one, preferably by two. The use of a sub-harmonic in the PLL-1 loop is necessary for getting the required suppression of receiver spurious responses. Too high a multiplication factor would render the loop response of the phase-lock-loop too slow, because of a lower cut-off frequency of a PLL loop filter (not shown), which would be undesirable for cordless telephony in which a lot of different channels have to be scanned. Further shown are signals Rx and Tx at the transceiver front end, and a receiver VCO-signal Rx_VCO after the first frequency multiplier arrangement 12. The phase-lock-loop PLL-1 comprises a voltage controlled oscillator 13, which is coupled to a first synthesizer 14. The transmitter branch 3 comprises a pre-amplifier 15, a power amplifier 16, and a transmit filter 17. The transmitter branch 3 further comprises a second phase-lock-loop PLL-2 for providing a second local oscillator signal LO2 to an rf-path of the transmitter branch 3 via a second frequency multiplier arrangement 18. The phase-lock-loop PLL-2 comprises a voltage controlled oscillator 19, which is coupled to a second synthesizer 20. In an embodiment of the present invention, the second frequency multiplier arrangement 18 may be dispensed with, but it provides the advantage that the oscillator 19 can be less expensive because it operates at a lower frequency. The first and the second synthesizer 14 and 20 are galvanically coupled, and are controlled by a reference crystal oscillator 21. Such a so-called dual synthesizer can be said IC of type UMA1015M. According to the present invention, the first phase-lock-loop PLL-1 comprises a first filter 22 for suppressing said receiver spurious response, and the second phase-lock-loop PLL-2 comprises a second filter 23 for suppressing said transmitter spurious emissions. In an embodiment, indicated with solid lines, the first filter 22 is a first low pass filter coupled between the oscillator 13 and the synthesizer 14, and the second filter 23 is a second high pass filter coupled between an output of the frequency multiplier 18 and the synthesizer 20. In another embodiment, indicated with dashed lines, the first filter 22 is a first high pass filter coupled between the mixer 7 and the synthesizer 14, and the second filter 23 is a low pass filter coupled between the oscillator 19 and the synthesizer 20. Low pass filters and high pass filters as such are well-known in the art, and are not described in detail here. A low pass filter for use in the present invention has to be dimensioned such that it blocks the spurious higher frequency signal and passes PLL frequencies. With respect to a high pass filter according to the present invention, the opposite holds.

FIG. 3 shows frequencies for the first and second stations BS, and HS1 and HS2 in the system 1 according to the present invention. Shown are frequencies in MHz for the various signals described, i.e. Tx, Rx, and Rx_VCO, for a CT1 system and a CT1$^+$ system.

I claim:

1. A telecommunication system which includes a first station having a first transceiver and a second station having a second transceiver, the first and second stations being arranged for radio communication with each other; at least the first transceiver comprising:

a receiver branch with a first phase-lock-loop for providing a first local oscillator signal (LO1), and a transmitter branch with a second phase-lock-loop for providing a second local oscillator signal (LO2);

the first and second phase-lock-loops respectively comprising first and second synthesizers which are coupled to each other;

the receiver branch comprising a first frequency multiplier for multiplying the first local oscillator signal (LO1) by a first integer greater than one, the multiplied signal being produced at an output of the first multiplier which is coupled to an rf-path in the receiver branch; and a first filter in the phase-lock-loop of one of said branches for suppressing signals which reach said one branch from the other branch via said first and second synthesizers.

2. A telecommunication system as claimed in claim 1, wherein said first filter is a low pass filter and is coupled between an input of the first frequency multiplier and the first synthesizer.

3. A telecommunication system as claimed in claim 1, wherein the first filter is a high pass filter and is coupled between the output of the first frequency multiplier and the first synthesizer.

4. A telecommunication system as claimed in claim 1, wherein the first filter is in the phase-lock-loop of the receiver branch, and the transmitter branch further comprises:

a second frequency multiplier for multiplying the second local oscillator signal (LO2) by a second integer value greater than one, the multiplied signal being produced at an output of the second frequency multiplier which is coupled to an rf-path in the transmitter branch; and a second filter in the phase-lock-loop of the transmitter branch, said second filter (i) being a high pass filter which is coupled between the output of the second frequency multiplier and the second synthesizer, when said first filter is a low pass filter, and (ii) being a low pass filter which is coupled between an input of the second frequency multiplier and the second synthesizer, when said first filter is a high pass filter.

5. A station for use in a telecommunication system having a plurality of stations which are arranged for radio communication with each other, said station including a transceiver comprising:

a receiver branch with a first phase-lock-loop for providing a first local oscillator signal (LO1), and a transmitter branch with a second phase-lock-loop for providing a second local oscillator signal (LO2);

the first and second phase-lock-loops respectively comprising first and second synthesizers which are coupled to each other;

the receiver branch comprising a first frequency multiplier for multiplying the first local oscillator signal (LO1) by a first integer greater than one, the multiplied signal being produced at an output of the first multiplier which is coupled to an rf-path in the receiver branch; and a filter in the phase-lock-loop of one of said branches for suppressing signals which reach said one branch from the other branch via said first and second synthesizers.

6. A transceiver comprising:

a receiver branch with a first phase-lock-loop for providing a first local oscillator signal (LO1), and a transmitter branch with a second phase-lock-loop for providing a second local oscillator signal (LO2);

the first and second phase-lock-loops respectively comprising first and second synthesizers which are electrically coupled to each other;

the receiver branch comprising a first frequency multiplier for multiplying the first local oscillator signal (LO1) by a first integer greater than one, the multiplied signal being produced at an output of the first frequency multiplier which is coupled to an rf-path in the receiver branch; and a first filter in the phase-lock-loop of one of said branches for suppressing signals which reach said one branch from the other branch via said first and second synthesizers.

7. A transceiver as claimed in claim 6, wherein the first filter is in the phase-lock-loop of the receiver branch, and the transmitter branch further comprises:

a second frequency multiplier for multiplying the second local oscillator signal (LO2) by a second integer value greater than one, the multiplied signal being produced at an output of the second frequency multiplier which is coupled to an rf-path in the transmitter branch; and a second filter in the phase-lock-loop of the transmitter branch, said second filter (i) being a high pass filter which is coupled between the output of the second frequency multiplier and the second synthesizer, when said first filter is a low pass filter, and (ii) being a low pass filter which is coupled between an input of the second frequency multiplier and the second synthesizer, when said first filter is a high pass filter.

* * * * *